(12) United States Patent
Kim et al.

(10) Patent No.: US 12,209,805 B2
(45) Date of Patent: Jan. 28, 2025

(54) ELECTRODE DRYING DEVICE AND ELECTRODE DRYING METHOD

(71) Applicant: LG ENERGY SOLUTION, LTD., Seoul (KR)

(72) Inventors: Kyoung Ho Kim, Daejeon (KR); Kyung Mee Lee, Daejeon (KR); Hyun Jin Yang, Daejeon (KR); Hyun Sup Lee, Daejeon (KR); Won Chan Park, Daejeon (KR); Myung Han Lee, Daejeon (KR); Ji Eun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 156 days.

(21) Appl. No.: 17/797,468

(22) PCT Filed: Nov. 11, 2020

(86) PCT No.: PCT/KR2020/015817
§ 371 (c)(1),
(2) Date: Aug. 4, 2022

(87) PCT Pub. No.: WO2022/055018
PCT Pub. Date: Mar. 17, 2022

(65) Prior Publication Data
US 2023/0016387 A1    Jan. 19, 2023

(30) Foreign Application Priority Data

Sep. 10, 2020    (KR) .......................... 10-2020-0116020

(51) Int. Cl.
*F26B 25/22*    (2006.01)
*F26B 3/04*    (2006.01)
(Continued)

(52) U.S. Cl.
CPC ........... *F26B 25/22* (2013.01); *G01N 21/251* (2013.01); *G01N 21/31* (2013.01); *G06T 7/0004* (2013.01);
(Continued)

(58) Field of Classification Search
CPC .... F26B 25/22; F26B 3/04; F26B 3/30; G06T 7/90; G06T 2207/10024; G06T 7/0004;
(Continued)

(56) References Cited

U.S. PATENT DOCUMENTS 2,972,196 A  *  2/1961  Early .................. B41F 23/0486
                                                        34/248
3,159,464 A  *  12/1964 Early .................. B41F 23/0406
                                                        34/275
(Continued)

FOREIGN PATENT DOCUMENTS

CN    105890763 A    8/2016
CN    115104196 A  *  9/2022  ............ F26B 21/004
(Continued)

OTHER PUBLICATIONS

Extended European Search Report dated Jul. 9, 2024 issued in European Patent Application No. 20953420.5.
(Continued)

*Primary Examiner* — Stephen M Gravini
(74) *Attorney, Agent, or Firm* — MORGAN, LEWIS & BOCKIUS LLP

(57) ABSTRACT

The present invention relates to an electrode drying apparatus and an electrode drying method, and the electrode drying apparatus includes: an oven configured to provide a space in which the electrode is dried and to include a hot air nozzle or an infrared heater; a color coordinate measuring unit configured to be positioned at an outlet of the oven and measure a color coordinate value of an electrode active (Continued)

material layer with respect to the dried electrode; and a controller configured to analyze a drying result of the electrode from the color coordinate value, determine whether the electrode is defective in drying, and control a drying condition of the electrode.

10 Claims, 4 Drawing Sheets

(51) Int. Cl.
    *F26B 3/30*     (2006.01)
    *G01N 21/25*     (2006.01)
    *G01N 21/31*     (2006.01)
    *G06T 7/00*     (2017.01)
    *G06T 7/90*     (2017.01)
    *H01M 4/04*     (2006.01)

(52) U.S. Cl.
    CPC .............. *G06T 7/90* (2017.01); *H01M 4/0404* (2013.01); *H01M 4/0471* (2013.01); *F26B 3/04* (2013.01); *F26B 3/30* (2013.01); *G06T 2207/10024* (2013.01)

(58) Field of Classification Search
    CPC ... G01N 21/251; G01N 21/31; H01M 4/0404; H01M 4/0471
    USPC ........................................................... 31/218
    See application file for complete search history.

(56) References Cited

U.S. PATENT DOCUMENTS

| | | | | |
|---|---|---|---|---|
| 3,721,013 | A * | 3/1973 | Miller | F26B 21/06 219/710 |
| 6,840,069 | B2 * | 1/2005 | France | C11D 7/5009 68/12.02 |
| 6,903,377 | B2 * | 6/2005 | Yamazaki | H01L 27/1248 438/164 |
| 6,944,970 | B2 * | 9/2005 | Silverbrook | B41J 15/044 34/640 |
| 7,679,739 | B2 | 3/2010 | Hayashi et al. | |
| 9,394,786 | B2 * | 7/2016 | Duran Toro | E21B 49/005 |
| 10,199,635 | B2 | 2/2019 | Ho et al. | |
| 11,670,770 | B2 * | 6/2023 | Takahashi | C01G 53/66 429/223 |
| 11,936,036 | B2 * | 3/2024 | Momma | H01M 4/525 |
| 2007/0055951 | A1 | 3/2007 | Hayashi et al. | |
| 2012/0311852 | A1 | 12/2012 | Onoda et al. | |
| 2014/0014037 | A1 * | 1/2014 | Watanabe | H01M 4/0404 118/713 |
| 2014/0136132 | A1 | 5/2014 | Maekawa et al. | |
| 2017/0261310 | A1 | 9/2017 | Eun et al. | |
| 2020/0240915 | A1 | 7/2020 | Son et al. | |
| 2023/0016387 | A1 * | 1/2023 | Kim | G01N 21/251 |
| 2023/0128999 | A1 * | 4/2023 | Jeong | F26B 21/10 34/446 |
| 2023/0175776 | A1 * | 6/2023 | Son | F26B 25/22 34/443 |

FOREIGN PATENT DOCUMENTS

| | | | | |
|---|---|---|---|---|
| JP | H11-032600 | A | | 2/1999 |
| JP | 2005-142022 | A | | 6/2005 |
| JP | 3859413 | B2 | | 12/2006 |
| JP | 2007-066821 | A | | 3/2007 |
| JP | 2012209074 | A * | 10/2012 | .......... H01M 4/0404 |
| JP | 2013-178024 | A | | 9/2013 |
| JP | 2013-239348 | A | | 11/2013 |
| JP | 5354069 | B2 | | 11/2013 |
| JP | 5708557 | B2 | | 4/2015 |
| JP | 2016-186371 | A | | 10/2016 |
| JP | 2017-168343 | A | | 9/2017 |
| JP | WO2017-221404 | A1 | | 6/2018 |
| JP | 2019-102186 | A | | 6/2019 |
| JP | 2021008056 | A * | 1/2021 | ............ B41J 11/002 |
| KR | 10-2013-0076758 | A | | 7/2013 |
| KR | 10-2014-0062406 | A | | 5/2014 |
| KR | 10-2017-0068977 | A | | 6/2017 |
| KR | 10-2017-0106587 | A | | 9/2017 |
| KR | 10-2018-0125721 | A | | 11/2018 |
| KR | 10-2019-0029305 | A | | 3/2019 |
| KR | 10-2019-0052701 | A | | 5/2019 |
| KR | 10-2019-0084470 | A | | 7/2019 |
| KR | 20220033761 | A * | 3/2022 | |
| WO | 2011/104843 | A1 | | 6/2013 |
| WO | 2014/118934 | A1 | | 8/2014 |
| WO | WO-2022055018 | A1 * | 3/2022 | ............ F26B 21/004 |

OTHER PUBLICATIONS

Office Action issued in corresponding Japanese application 2022-546532 dated Feb. 5, 2024 with machine translation.

International Search Report (with partial translation) and Written Opinion dated Jun. 8, 2021 issued in corresponding International Patent Application No. PCT/KR2020/015817.

Office Action dated Jul. 31, 2024 issued in Korean Patent Application No. 10-2020-0116020.

Notice of Allowance dated Jul. 17, 2024 issued in Japanese Patent Application No. 2022-546532, with English Translation Note: KR 10-2019-0084470 A, JP 2012-209074 A, JP 2013-239348 A, KR 10-2019-0084470 A, JP 2013-178024 A, JP 2016-186371 A, WO 2011/104843 A1, JP 2007-066821 A, WO 2014/118934 A1, JPH11-032600 A cited therein is already of record.

Office Action issued in corresponding Japanese Patent Application No. 2022-546532 dated Aug. 7, 2023. Note: KR 10-2019-0084470 and JP 2012-209074 cited therein are already of record.

* cited by examiner

[FIG. 1]
100
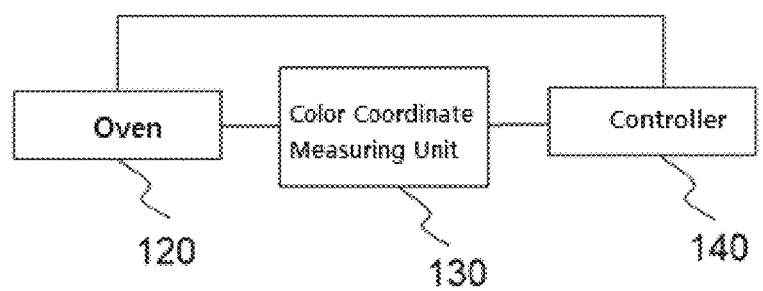

[FIG. 2]
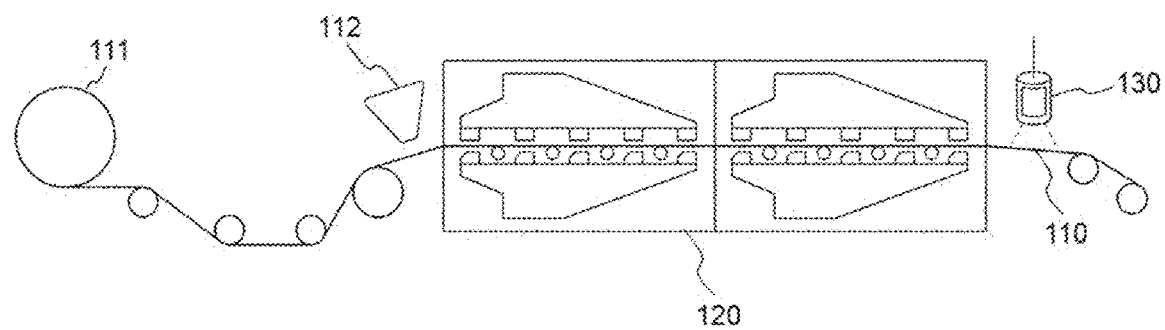

[FIG. 3]
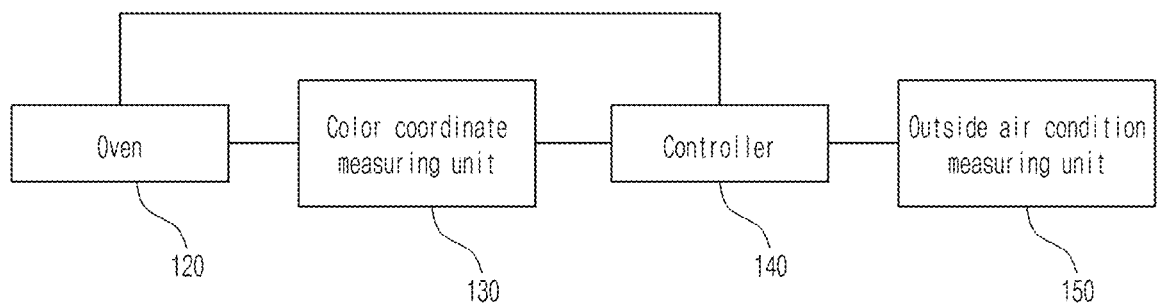

[FIG. 4]
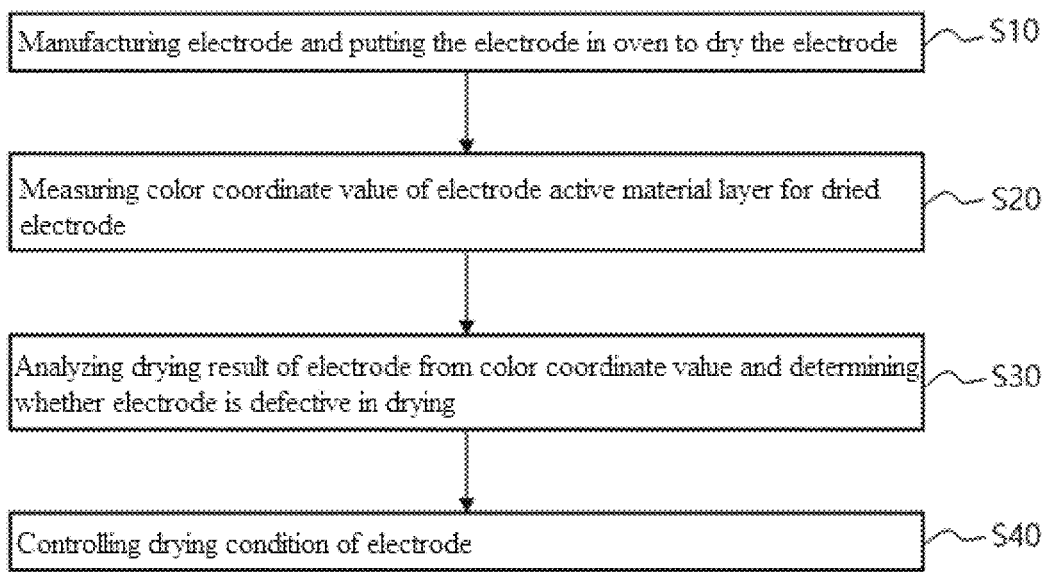

ELECTRODE DRYING DEVICE AND ELECTRODE DRYING METHOD

TECHNICAL FIELD

This application claims the benefit of priority based on Korean Patent Application No. 10-2020-0116020, filed on Sep. 10, 2020, and the entire contents of the Korean patent application are incorporated herein by reference.

The present invention relates to an electrode drying apparatus and an electrode drying method, and more particularly, to an electrode drying automatic control system and an electrode drying automatic control method by measuring a gray level value.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

The positive electrode and the negative electrode are formed by applying a positive electrode slurry containing a positive electrode active material and a negative electrode slurry containing a negative electrode active material to a positive electrode current collector and a negative electrode current collector, to thereby form a positive electrode active material layer and a negative electrode active material layer, respectively, followed by drying and rolling them.

At this time, the quality of the electrode is determined according to the drying conditions. If the amount of drying heat is excessive, a significant amount of the binder in the electrode slurry moves to the surface during the drying process, thereby reducing the adhesive force of the electrode. If the amount of drying heat is low, the solvent remains in the electrode, causing roll contamination in the coating and rolling process.

In addition, in a general electrode drying process, the amount of heat for drying the electrode is supplied by hot air and infrared heaters. Herein, even under the same drying conditions, a change in drying quality occurs depending on the internal and external environment of the oven, so a control system for checking the electrode quality in real time and automatically changing the drying conditions is required.

In this regard, in the related art, there was no method in which a change in electrode quality such as electrode adhesive force could be checked in real time and the drying conditions of the electrode could be changed therefrom. For this reason, after the electrode production was completed, the quality of the electrode was checked to determine whether it was defective, which caused the defect rate to rise.

Therefore, it is necessary to develop a technology for real-time drying condition control of an electrode that can solve the above problems.

DISCLOSURE

Technical Problem

The present invention was conceived to solve the above problems, and an object of the present invention is to provide an electrode drying apparatus and an electrode drying method capable of improving the quality of an electrode by checking the quality of an electrode in real time and adjusting the drying conditions of the electrode in real time accordingly.

Technical Solution

In one example, an apparatus for drying an electrode includes: an oven configured to provide a space in which the electrode is dried and to include a hot air nozzle or an infrared heater; a color coordinate measuring unit configured to be positioned at an outlet of the oven and measure a color coordinate value of an electrode active material layer with respect to the dried electrode; and a controller configured to analyze a drying result of the electrode from the color coordinate value, determine whether the electrode is defective in drying, and control a drying condition of the electrode.

In one example, the color coordinate value may be L*.

In another example, the color coordinate value is a gray value according to a gray scale.

In one example, the color coordinate measuring unit includes a spectrophotometer or a colorimeter.

In a specific example, the controller analyzes a drying degree of the electrode or distribution of the binder in the electrode from the color coordinate value, and determines whether there is a defect in drying.

In another example, the apparatus according to the present invention further includes an outside air condition measuring unit configured to measure a temperature and humidity of the outside air.

In a specific example, the controller may reset a drying condition by reflecting an existing drying condition and a temperature and humidity of the outside air when it is determined that the electrode is defective in drying.

In a specific example, the controller reflects the reset drying condition and changes the drying condition of the electrode in real time.

In a specific example, the controller automatically updates the reset drying condition through machine learning.

Further, a method for drying an electrode according to the present invention includes: a step of manufacturing an electrode by forming an electrode active material layer including an electrode active material on a current collector, and putting the electrode in an oven of the above-described apparatus to thereby dry the electrode; a step of measuring a color coordinate value of the electrode active material layer with respect to the dried electrode; a step of analyzing a drying result of the electrode from the color coordinate value, and determining whether the electrode is defective in drying; and a step of controlling the drying condition of the electrode.

In one example, the color coordinate value may be L*.

In another example, the color coordinate value is a gray value according to a gray scale.

In one example, the step of measuring the color coordinate value of the electrode active material layer may be performed through a spectrophotometer or a colorimeter.

In another example, the step of measuring the color coordinate value of the electrode active material layer includes obtaining an image by photographing the surface of the electrode through illumination and an image sensor, and converting the color information of the image into color coordinates.

In one example, the step of analyzing the drying result of the electrode and determining whether the electrode is defective in drying includes a process of analyzing a drying degree of the electrode or distribution of the binder in the electrode from the color coordinate value, and determining whether the electrode is defect in drying.

In another example, the method according to the present invention further includes a step of measuring a temperature and humidity of the outside air.

In a specific example, the step of controlling the drying condition of the electrode includes a process of resetting the drying condition by reflecting an existing drying condition and a temperature and humidity of the outside air when it is determined that the electrode is defective in drying.

In a specific example, the step of controlling the drying condition of the electrode further includes a process of changing the drying condition of the electrode in real time by reflecting the reset drying condition.

In a specific example, the step of controlling the drying condition of the electrode further includes a process of automatically updating the reset drying condition through machine learning.

Advantageous Effects

The present invention can improve the quality of the electrode by measuring the color coordinates of the electrode after drying to capture the electrode quality in real time, such as the adhesive force of the electrode or whether the electrode has been dried, and adjusting the drying conditions of the electrode in real time by reflecting this.

BRIEF DESCRIPTION OF THE DRAWINGS

FIG. 1 is a block diagram showing the configuration of an electrode drying apparatus according to an embodiment of the present invention.

FIG. 2 is a schematic diagram showing a process of measuring a color coordinate value of an electrode in the electrode drying apparatus according to the present invention.

FIG. 3 is a block diagram showing the configuration of an electrode drying apparatus according to another embodiment of the present invention.

FIG. 4 is a flowchart showing the procedure of an electrode drying method according to the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings. FIG. 1 is a block diagram showing the configuration of an electrode drying apparatus according to an embodiment of the present invention.

Referring to FIG. 1, an electrode drying apparatus 100 according to the present invention includes: an oven 120 configured to provide a space in which the electrode is dried and to include a hot air nozzle or an infrared heater; a color coordinate measuring unit 130 configured to be positioned at an outlet of the oven 120 and measure a color coordinate value of an electrode active material layer with respect to the dried electrode; and a controller 140 configured to analyze a drying result of the electrode from the color coordinate value, determine whether the electrode is defective in drying, and control a drying condition of the electrode.

As described above, a change in drying quality occurs depending on the internal and external environment of the oven even under the same drying conditions. Conventionally, there was no way to check changes in electrode quality such as electrode adhesive force in real time and change the drying conditions of the electrode therefrom. For this reason, after the electrode production was completed, the quality of the electrode was checked to determine whether it was defective, which caused the defect rate to rise.

Therefore, the present invention can improve the quality of the electrode by measuring the color coordinates of the electrode after drying to capture the electrode quality in real time, such as the adhesive force of the electrode or whether the electrode has been dried, and adjusting the drying conditions of the electrode in real time by reflecting this.

Hereinafter, the configuration of the electrode drying apparatus according to the present invention will be described in detail.

FIG. 2 is a schematic diagram showing a process of measuring a color coordinate value of an electrode in the electrode drying apparatus according to the present invention.

Referring to FIG. 2, an electrode drying apparatus 100 according to the present invention includes an oven 120. The oven 120 has a chamber shape and provides a space in which the electrode 110 is dried. The electrode 110 to be dried is temporarily accommodated during the drying process, and internal heat may be prevented from escaping to the outside for drying.

Meanwhile, the electrode 110 may have a structure in which an electrode active material layer is formed by applying an electrode slurry including an electrode active material on a current collector. The electrode slurry may be applied to at least one surface of the current collector.

Referring to FIG. 2, the current collector is wound around a separate unwinding roller 111 and then unwound therefrom. An electrode slurry is applied to at least one surface of the unwound current collector, and the electrode slurry may be applied by, for example, the slot die 112. The electrode 110 to which the electrode slurry is applied is put into the oven 120 and dried.

In this case, the current collector may be a positive electrode current collector or a negative electrode current collector, and the electrode active material may be a positive electrode active material or a negative electrode active material. In addition, the electrode slurry may further include a conductive material and a binder in addition to the electrode active material.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCO_{1-(b+c+d)}MdO_{(2-e)}A_e$ such as $Li_{1-z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers and the like.

Meanwhile, such an electrode slurry may be prepared by dissolving an electrode active material, a conductive material, and a binder in a solvent. The type of the solvent is not particularly limited as long as it is capable of dispersing an electrode active material, and either an aqueous solvent or a non-aqueous solvent may be used. For example, the solvent may be a solvent generally used in the art, such as dimethyl sulfoxide (DMSO), isopropyl alcohol, N-methylpyrrolidone (NMP), acetone, or water, and one of them alone or a mixture of two or more may be used. The amount of the solvent used may be such that the slurry can be adjusted to have an appropriate viscosity in consideration of the coating thickness, production yield, and workability of the slurry, and is not particularly limited.

The oven 120 may include a hot air nozzle and an infrared heater for drying the electrode 110 therein. The hot air nozzle and the infrared heater may be arranged to be spaced apart at predetermined intervals along the transport direction (MD direction) of the electrode, and apply hot air or infrared rays in a direction perpendicular to the electrode.

On the other hand, the hot air nozzle includes a main body unit and an injection unit. The main body unit constitutes the body of the hot air nozzle, and fixes the hot air nozzle to the ceiling of the oven. In addition, the main body unit is empty inside and transmits hot air transmitted from a hot air supply source (not shown) to the injection unit. On the other hand, the injection unit is provided on the lower surface of the main body unit. The injection unit communicates with the main body unit, and an injection hole portion through which hot air is injected is formed on the lower surface of the injection unit. The injection hole portion may have a structure in which a plurality of pores are arranged at regular intervals.

Meanwhile, the infrared heater may include an infrared lamp that irradiates infrared rays to the electrode and a cradle that supports or mounts the infrared lamp. The shape of the infrared lamp is not particularly limited, and for example, the rod-shaped lamp may be arranged in parallel along the transfer direction of the electrode while extending in the width direction of the electrode.

The oven 120 may be divided into a plurality of drying zones. If the electrode is overdried or is not sufficiently dried during the drying process of the electrode, it is necessary to properly dry the electrode while changing the drying intensity. In this case, by dividing the oven into a plurality of drying zones, drying conditions can be independently managed for each drying zone. FIG. 2 shows that the oven 120 is shown in a shape divided into two drying zones. In this case, each drying zone may be a space physically divided by actually installing an inner wall between the drying zones, or may be a space that is abstractly partitioned according to drying conditions performed in the drying zone.

Meanwhile, referring to FIG. 2, the color coordinate measuring unit 130 is located at the outlet of the oven 120 and measures a color coordinate value of the electrode active material layer with respect to the dried electrode 110. In this case, the color coordinate value of the electrode may be a color coordinate value measured at a certain point of a certain electrode active material layer, and after selecting several measurement points in the electrode active material layer, the average value of the color coordinate values measured at the measurement points may be used as the color coordinate value. In addition, in FIG. 2, since the electrode active material layer is formed on one side of the current collector, the color coordinate measuring unit was located on the surface where the electrode active material layer was formed, but when the electrode active material layer is formed on both surfaces of the current collector, the color coordinate measuring unit may be located on both surfaces of the electrode.

The color coordinate measuring unit may include an illumination capable of irradiating light on the surface of the electrode 110 and a sensor capable of detecting the color and brightness of the surface of the electrode. In this case, there is no particular limitation on the type as long as light can be illuminated on the surface of the electrode active material layer as the lighting, but, for example, LED lighting may be used. In addition, as will be described later, when photographing the surface of the electrode, a camera device for this may be additionally provided. In the case of FIG. 2, since electrode slurry is applied to one surface of the current collector to form an electrode active material, the color coordinate measuring unit is located only on one surface of the electrode. However, when electrode active material layers are formed on both surfaces of the current collector, the color coordinate measuring unit may be provided on both surfaces of the electrode in order to measure the dry state of each electrode active material layer.

The present invention installs only a simple device capable of measuring color coordinates at the outlet of the oven 120 and quantifies the drying quality of the electrode through color coordinate measurement, thereby simplifying the configuration of the measuring device and reducing the time and cost required for evaluation.

In one example, the color coordinate value may be $L^*$. The $L^*$ is one of the variables representing the $L^*a^*b^*$ colorimeter defined by the CIE. In the $L^*a^*b^*$ colorimeter, the color coordinate $L^*$ is a value related to the measured lightness of an object and is displayed from 0 to 100. Values a and b are values related to chromaticity representing color and chroma, and a is for the horizontal axis and b is for the vertical axis. The +a side is red, the −a side is green, the +b side is yellow, and the −b side is blue. That is, in the present invention, it is possible to determine the drying quality of the electrode by measuring the $L^*$ value related to the contrast among color coordinates.

In another example, the color coordinate value may be a gray value according to a gray scale. That is, an image of the dry surface of the electrode may be converted into a gray scale capable of confirming only the contrast, and a gray value may be measured therefrom to determine the drying quality of the electrode.

As described above, in the present invention, the color coordinates that can uniformly measure the contrast of the electrode surface are used, and the drying quality of the electrode can be determined by quantitatively measuring the contrast of the surface of the electrode active material layer.

At this time, a colorimeter may be used as a sensor that measures a color coordinate value of the electrode active material layer. Specifically, the color coordinate measuring unit 130 includes a spectrophotometer or a colorimeter. In this case, a color coordinate value may be directly measured on the surface of the electrode active material layer.

For example, the color coordinate value may be measured using a CM2600d manufactured by Konica Minolta as the colorimeter. Specifically, in order to measure the color coordinate value, the measurement mode was set to SCI (Specular Component Included) or SCE (Specular Component Excluded), standard light source D65 (color temperature: 6500K), CIE 1964 10° standard observer using Konica Minolta's CM2600d as the colorimeter, followed by white calibration, followed by touching the colorimeter to the location desired to be measured.

As described above, the color coordinate value may be measured using a colorimeter directly with respect to the electrode 110, but the color coordinate value may be indirectly measured using an image obtained by photographing the surface of the electrode active material layer.

In another example, the color coordinate measuring unit 130 includes an image sensor capable of taking an image of a surface of the electrode active material layer. In this case, an image of the electrode surface is obtained by photographing the electrode, specifically, the surface of the electrode active material layer through the image sensor. In this case, a camera may be used as the image sensor. When an image is obtained, it is converted into a color coordinate system to be measured, and a color coordinate value is measured. For example, after converting an image photographed through a camera into a gray scale, the gray value or L* value of the corresponding image may be measured.

Meanwhile, the controller 140 analyzes the drying result of the electrode 110 from the color coordinate value, determines whether the electrode 110 is defective in drying, and controls the drying condition of the electrode 110. The controller 140 analyzes a drying degree of the electrode 110 or distribution of the binder in the electrode 110 from the color coordinate value, and determines whether there is a defect in drying. To this end, a separate operation program may be installed in the controller.

Specifically, the controller 140 may evaluate the adhesive force of the electrode active material layer according to drying of the electrode by analyzing the distribution of the binder in the electrode. For example, if the binder is distributed over the electrode surface, that is, the surface of the electrode active material layer during the electrode drying process, the color of the electrode surface changes in a direction close to black due to the binder, thereby decreasing the color coordinate (L*) value. That is, the smaller the color coordinate value is, the more the binder is distributed on the surface of the electrode active material, so that the adhesive force of the electrode active material layer to the current collector decreases.

In addition, the controller 140 may analyze the drying degree of the electrode and whether the drying is completed by measuring a color coordinate value. When the electrode is not sufficiently, as the average refractive index on the surface of the electrode active material layer decreases due to the solvent remaining in the electrode active material layer, the reflectivity decreases, so that it exhibits a darker color than the dried electrode, and the L* value will be measured smaller.

That is, in the present invention, when the color coordinate value is smaller than the preset value, the controller 140 may determine the drying quality of the electrode as being defective. The preset value may be selected from color coordinate values of the electrodes determined to be good by measuring drying quality of a plurality of electrodes. For example, the preset value may be derived from a profile of a color coordinate value according to an adhesive force of an electrode or a solvent content in the electrode. To this end, color coordinate values for a plurality of electrode samples are measured, and adhesive force and solvent content in the electrode are measured accordingly, to thereby be formed as a database. Thereafter, a color coordinate value capable of satisfying both the criteria of the adhesive force of the electrode active material layer and the content of the solvent in the electrode may be derived.

FIG. 3 is a block diagram showing the configuration of an electrode drying apparatus according to another embodiment of the present invention.

Referring to FIG. 3, in another example, an electrode drying apparatus 200 according to the present invention includes: an oven 120 configured to provide a space in which the electrode is dried and to include a hot air nozzle or an infrared heater; a color coordinate measuring unit 130 configured to be positioned at an outlet of the oven 120 and measure a color coordinate value of an electrode active material layer with respect to the dried electrode; and a controller 140 configured to analyze a drying result of the electrode from the color coordinate value, determine whether the electrode is defective in drying, and control a drying condition of the electrode, and the electrode drying apparatus 200 may further include an outside air condition measuring unit 150 configured to measure a temperature and humidity of outside air.

As described above, in the drying process of the electrode, even when the same drying conditions are applied, a change in drying quality occurs depending on the internal and external environments of the oven. For example, when the humidity of the outside air of the oven is high, the electrode may not be sufficiently dried even under the same drying condition, and conversely, when the humidity of the outside air is low, the electrode may be overdried even under the same drying condition.

Accordingly, in the electrode drying apparatus according to the present invention, the outside air condition measuring unit 150 measures the temperature and humidity of the outside air, and transmits the measured value to the controller so that the condition of the outside air can be reflected in the drying condition. The outside air condition measuring unit 150 may be installed outside the oven 120 and may be installed to be spaced apart from the oven 120 so as not to be affected by heat from the oven 120.

Meanwhile, when the controller 140 determines whether the electrode is defective in drying as a result of checking whether the electrode is defective in drying based on the color coordinate value, the drying condition may be reset by reflecting the existing drying condition and the temperature and humidity of the outside air. Further, the controller 140 may reflect the previously measured color coordinate value in resetting the drying condition.

There are various drying conditions that are reset at this time, and for example, the transfer speed of the electrode, the temperature of the hot air sprayed from the hot air nozzle, the flow rate of the hot air, and the output of the infrared heater can be adjusted. In addition, when a screen for blocking infrared rays and hot air is installed between the infrared heater or the hot air nozzle, the area in which the electrode is exposed to the hot air or infrared rays may be controlled by adjusting the position of the screen or the number of screens.

The controller 140 reflects the reset drying condition and changes the drying condition of the electrode in real time. Through this, the defective rate of the electrode can be reduced and the quality of the electrode can be improved.

In addition, the controller 140 may automatically update the reset drying conditions through machine learning. Through this, drying conditions can be established according to specifications of electrodes to be manufactured and conditions of outside air, and drying conditions can be automatically selected and adjusted during production of the corresponding electrodes in the future.

For example, the machine learning may be performed through a method such as deep learning. As described above, since the operation program is installed in the controller 140, first, learning data may be constructed from a plurality of data obtained while measuring drying quality of a plurality of electrodes, and drying conditions according to specifications of electrodes to be manufactured and conditions of outside air may be learned from this. This can later be reflected in the evaluation of the drying quality of other electrodes.

Likewise, the present invention can improve the quality of the electrode by measuring the color coordinates of the electrode after drying to evaluate the electrode drying quality in real time, such as the adhesive force of the electrode or whether the electrode has been dried, adjusting the drying conditions of the electrode in real time by reflecting this, and then reflecting the adjustment in the electrode quality evaluation again.

In addition, the present invention provides an electrode drying method.

FIG. 4 is a flowchart showing the procedure of an electrode drying method according to an embodiment of the present invention.

Referring to FIG. 4, a method for drying an electrode according to the present invention includes: a step (S10) of manufacturing an electrode by forming an electrode active material layer including an electrode active material on a current collector, and putting the electrode in an oven of the above-described apparatus to thereby dry the electrode; a step (S20) of measuring a color coordinate value of the electrode active material layer with respect to the dried electrode; a step (S30) of analyzing a drying result of the electrode from the color coordinate value, and determining whether the electrode is defective in drying; and a step (S40) of controlling the drying condition of the electrode.

The present invention can improve the quality of the electrode by measuring the color coordinates of the electrode after drying to evaluate the electrode drying quality in real time, such as the adhesive force of the electrode or whether the electrode has been dried, adjusting the drying conditions of the electrode in real time by reflecting this, and then reflecting the adjustment in the electrode quality evaluation again.

Hereinafter, each step of the electrode drying method according to the present invention will be described.

<Preparation and Drying of Electrode>

Referring to FIG. 4, first, an electrode active material layer including an electrode active material is formed on a current collector to measure color coordinate values, thereby manufacturing an electrode. Details of the electrode are the same as described above.

When electrode manufacturing is completed, the electrode is put into an oven and dried. In this case, the drying time and the drying heat amount may be determined by the specifications of the electrode, for example, the loading amount of the electrode active material or the solvent content in the electrode slurry, the binder content in the electrode slurry, etc. The dried electrode is discharged out of the oven.

<Measurement of Color Coordinate Value>

When drying of the electrode is completed, a color coordinate value is measured for the dried electrode. In this case, the color coordinate value of the electrode active material layer is measured by a color coordinate measuring unit according to the electrode drying apparatus as described above. Since the color coordinate measuring unit is located near the outlet of the oven, the color coordinate value can be measured directly with respect to the electrode discharged from the oven. As described above, the color coordinate value of the electrode may be a color coordinate value measured at a certain point of a certain electrode active material layer, and after selecting several measurement points in the electrode active material layer, the average value of the color coordinate values measured at the measurement points may be used as the color coordinate value.

The present invention installs only a simple device capable of measuring color coordinates near the outlet of the oven and quantifies the dry state of the electrode through color coordinate measurement, thereby simplifying the measuring method and reducing the time and cost required for evaluation.

Meanwhile, in a specific example of the present invention, the electrode may not be rolled. That is, the present invention does not evaluate the electrode that has passed through the rolling process, but by performing the evaluation on the electrode that has not undergone the rolling process, it is possible to filter out defective electrodes before the rolling process and significantly reduce the defect rate after the rolling process. This can prevent contamination of the rolling roll, etc. due to residual solvent in the electrode in the rolling process. However, the present invention is not limited thereto, and color coordinates may be measured at any stage after drying the electrode.

In one example, the color coordinate value may be $L^*$. As described above, $L^*$ is a value related to the measured lightness of the object and may be displayed from 0 to 100.

In another example, the color coordinate value may be a gray value according to a gray scale. That is, an image of the dry surface of the electrode may be converted into a gray scale capable of confirming only the contrast, and a gray value may be measured therefrom to determine whether the electrode is dried.

As described above, in the present invention, the color coordinates that can uniformly measure the contrast of the electrode surface are used, and the drying quality can be determined by quantitatively measuring the contrast of the surface of the electrode active material layer.

In one example, the step of measuring the color coordinate value of the electrode active material layer may be performed through a spectrophotometer or a colorimeter. In this case, a color coordinate value may be directly measured on the surface of the electrode active material layer.

In another example, the step of measuring the color coordinate value of the electrode active material layer may include obtaining an image by photographing the surface of the electrode through illumination and an image sensor, and converting the color information of the image into color coordinates. In this case, a camera may be used as the image sensor. When an image is obtained, it is converted into a color coordinate system to be measured, and a color coordinate value is measured. For example, after converting an image photographed through a camera into a gray scale, the gray value or $L^*$ value of the corresponding image may be measured.

As described above, the color coordinate value may be measured using a colorimeter directly with respect to the electrode, but the color coordinate value may be indirectly measured using an image obtained by photographing the surface of the electrode active material layer.

<Analysis of Drying Results and Determination of Defect in Drying>

When the color coordinate value is measured, it is determined from this whether the electrode is defective in drying. Specifically, the process of analyzing a drying degree of the electrode or distribution of the binder in the electrode from the color coordinate value, and determining whether there is a defect in drying may be performed. Specifically, the adhesive force of the electrode active material layer according to drying of the electrode may be evaluated through analysis of the distribution of the binder in the electrode, and the degree of drying and whether the drying of the electrode has been completed may be evaluated through color coordinate values.

In this case, when the color coordinate value is smaller than the preset value, it may be determined that the drying quality of the electrode is poor. The preset value may be selected from color coordinate values of the electrodes determined to be good by measuring drying quality of a plurality of electrodes. For example, the preset value may be derived from a profile of a color coordinate value according to an adhesive force of an electrode or a solvent content in the electrode. To this end, color coordinate values for a plurality of electrode samples are measured, and adhesive force and solvent content in the electrode are measured accordingly, to thereby be formed as a database. Thereafter, a color coordinate value capable of satisfying both the criteria of the adhesive force of the electrode active material layer and the content of the solvent in the electrode may be derived.

Meanwhile, the electrode drying method according to the present invention may further include measuring the temperature and humidity of the outside air. Here, the outside air means the air outside the oven. In the drying process of the electrode, even when the same drying conditions are applied, the drying quality is changed according to the internal and external environment of the oven, so the present invention can measure the temperature and humidity of the outside air and reflect this in the drying process.

<Controlling the Drying Conditions of the Electrode>

In the present invention, the step of controlling the drying condition of the electrode includes a process of resetting the drying condition by reflecting an existing drying condition and a temperature and humidity of the outside air when it is determined that the electrode is defective in drying. In this case, the previously measured color coordinate value may be reflected in resetting the drying condition.

There are various drying conditions that are reset at this time, and for example, the transfer speed of the electrode, the temperature of the hot air sprayed from the hot air nozzle, the flow rate of the hot air, and the output of the infrared heater can be adjusted. In addition, when a screen for blocking infrared rays and hot air is installed between the infrared heater or the hot air nozzle, the area in which the electrode is exposed to the hot air or infrared rays may be controlled by adjusting the position of the screen or the number of screens.

In addition, controlling the drying condition of the electrode further includes a process of changing the drying condition of the electrode in real time by reflecting the reset drying condition. Through this, the defective rate of the electrode can be reduced and the quality of the electrode can be improved.

In addition, controlling the drying condition of the electrode further includes a process of automatically updating the reset drying condition through machine learning. Through this, drying conditions can be established according to specifications of electrodes to be manufactured and conditions of outside air, and drying conditions can be automatically selected and adjusted during production of the corresponding electrodes in the future.

In this case, for example, the machine learning may be performed through a method such as deep learning. Learning data may be constructed from a plurality of data obtained while measuring the drying quality of a plurality of electrodes, and drying conditions according to specifications of electrodes to be manufactured and conditions of outside air may be learned from this. This can later be reflected in the evaluation of the drying quality of other electrodes.

Likewise, the present invention can improve the quality of the electrode by measuring the color coordinates of the electrode after drying to evaluate the electrode drying quality in real time, such as the adhesive force of the electrode or whether the electrode has been dried, adjusting the drying conditions of the electrode in real time by reflecting this, and then reflecting the adjustment in the electrode quality evaluation again.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS

100, 200: electrode drying apparatus
110: electrode
111: unwinding roller
112: slot die
120: oven
130: color coordinate measuring unit
140: controller
150: outside air condition measuring unit

The invention claimed is:

1. An apparatus for drying an electrode, comprising:
an oven configured to provide a space in which the electrode is dried and to include a hot air nozzle or an infrared heater;
a color coordinate measuring unit configured to be positioned at an outlet of the oven and to measure a color coordinate value of an electrode active material layer of a dried electrode; and
a controller configured to analyze a drying result of the dried electrode from the color coordinate value, to determine whether the dried electrode is defective in drying, and to control a drying condition.

2. The apparatus of claim 1, wherein the color coordinate value is L*.

3. The apparatus of claim 1, wherein the color coordinate value is a gray value according to a gray scale.

4. The apparatus of claim 1, wherein the color coordinate measuring unit includes a spectrophotometer or a colorimeter.

5. The apparatus of claim 1, wherein the color coordinate measuring unit includes an image sensor capable of taking an image of a surface of the electrode active material layer.

6. The apparatus of claim 1, wherein the controller is further configured to analyze a drying degree of the dried electrode or distribution of a binder in the dried electrode from the color coordinate value, and to determine whether there is a defect in drying.

7. The apparatus of claim 1, further comprising: an outside air condition measuring unit configured to measure a temperature and humidity of outside air.

8. The apparatus of claim 1, wherein the controller is further configured to reset a drying condition by reflecting an existing drying condition and a temperature and humidity of the outside air when determined that the dried electrode is defective in drying.

9. The apparatus of claim 8, wherein the controller is further configured to reflect the reset drying condition and to change the drying condition in real time.

10. The apparatus of claim 8, wherein the controller is further configured to automatically update the reset drying condition through machine learning.

* * * * *